United States Patent [19]
Beier et al.

[11] Patent Number: 6,065,018
[45] Date of Patent: May 16, 2000

[54] SYNCHRONIZING RECOVERY LOG HAVING TIME STAMP TO A REMOTE SITE FOR DISASTER RECOVERY OF A PRIMARY DATABASE HAVING RELATED HIERARCHIAL AND RELATIONAL DATABASES

[75] Inventors: Harley Al Beier, San Martin, Calif.; Robert Frederic Kern, Southampton, United Kingdom; David Wayne Moore, Morgan Hills, Calif.; Karen Alicia Ranson, San Jose, Calif.; Vern Lee Watts, Los Altos, Calif.

[73] Assignee: International Business Machines Corporation, Armonk, N.Y.

[21] Appl. No.: 09/034,867

[22] Filed: Mar. 4, 1998

[51] Int. Cl.[7] ....................................... G06F 17/30
[52] U.S. Cl. .......................... 707/202; 707/201; 707/203; 707/204; 714/12; 714/20; 709/101; 709/201
[58] Field of Search .................. 707/1–5, 8, 10, 707/200–205, 100–104; 714/1, 6, 12–13, 20, 731, 744, 775, 16–18; 711/113, 117–118, 130, 147, 153, 161, 162, 167–168; 709/101, 201, 203, 212–215, 217, 232, 248

[56] References Cited

U.S. PATENT DOCUMENTS

| | | | |
|---|---|---|---|
| 5,170,480 | 12/1992 | Mohan et al. | 707/201 |
| 5,278,982 | 1/1994 | Daniels et al. | 707/202 |
| 5,446,871 | 8/1995 | Shomler et al. | 714/1 |
| 5,561,795 | 10/1996 | Sarkar | 707/202 |
| 5,566,297 | 10/1996 | Devarakonda et al. | 714/15 |
| 5,594,863 | 1/1997 | Stiles | 714/15 |
| 5,594,900 | 1/1997 | Cohn et al. | 707/202 |
| 5,615,329 | 3/1997 | Kern et al. | 714/6 |
| 5,619,644 | 4/1997 | Crockett et al. | 714/45 |
| 5,640,561 | 6/1997 | Satoh et al. | 707/202 |
| 5,673,382 | 9/1997 | Cannon et al. | 714/6 |
| 5,682,513 | 10/1997 | Caldelaria et al. | 711/113 |
| 5,852,715 | 12/1998 | Raz et al. | 709/201 |
| 5,913,219 | 6/1999 | Back et al. | 707/202 |
| 5,924,096 | 7/1999 | Draper et al. | 707/10 |
| 5,949,970 | 9/1999 | Sipple et al. | 395/182.13 |

*Primary Examiner*—Anton W. Fetting
*Assistant Examiner*—Srirama Channavajjala
*Attorney, Agent, or Firm*—Gray Cary Ware Freidenrich

[57] ABSTRACT

A method and apparatus to synchronize recovery logs transmitted to a remote site for recovering related databases having different logical structuring. In one embodiment, the related databases are a hierarchial structured database such as IMS and a relational structured database such as DB2.

27 Claims, 7 Drawing Sheets

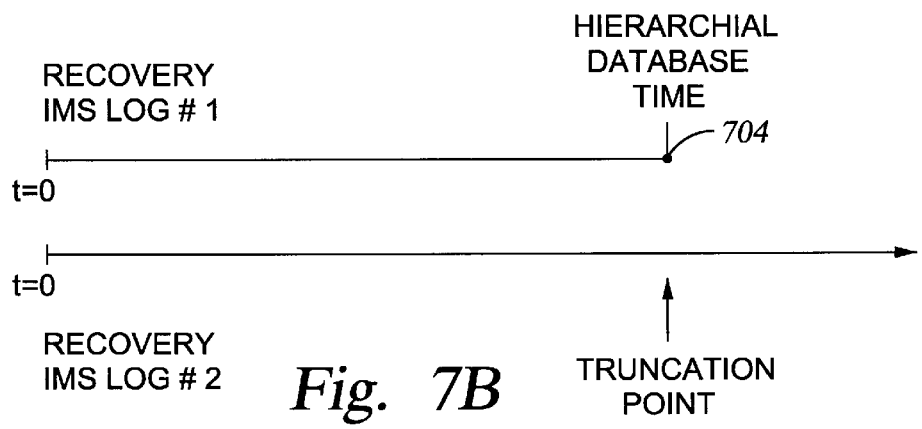
Fig. 7A
Fig. 7B
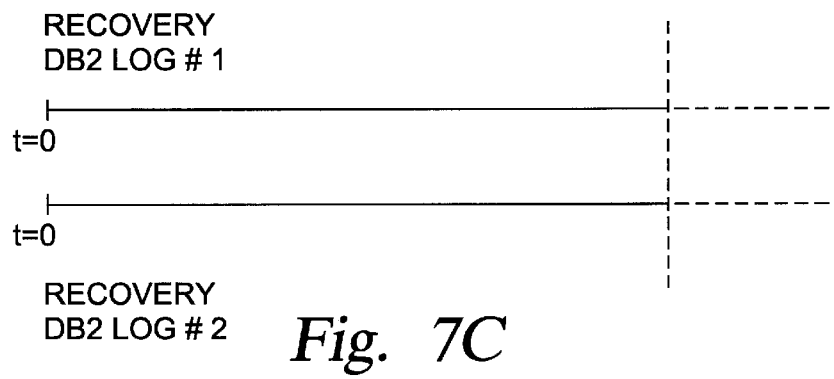
Fig. 7C
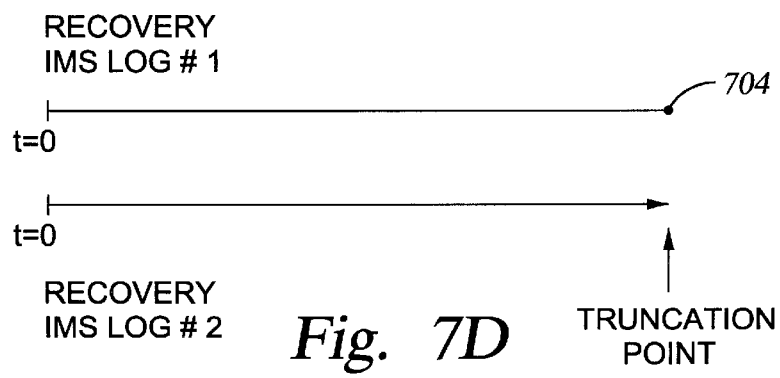
Fig. 7D

SYNCHRONIZING RECOVERY LOG HAVING TIME STAMP TO A REMOTE SITE FOR DISASTER RECOVERY OF A PRIMARY DATABASE HAVING RELATED HIERARCHIAL AND RELATIONAL DATABASES

BACKGROUND OF THE INVENTION

1. Field of the Invention

The present invention relates generally to disaster recovery in data processing systems using both hierarchial and relational databases. More particularly, the present invention relates to a method and apparatus to synchronize hierarchial and relational database recovery logs transmitted to a remote site for disaster recovery.

2. Description of the Related Art

Data processing systems typically require a large amount of data storage. Customer data, or data generated by users within the data processing system, usually occupy a great portion of this data storage. Effective data processing systems also provide back-up copies of this user data to insure against a loss of such data. For most businesses, any loss of data in their data processing systems is catastrophic, severely impacting the success of the business. To further protect customer data, some data processing systems extend the practice of making back-up recovery copies to provide disaster recovery. In disaster recovery systems, a recovery copy of the customer data is kept at a site remote from the primary storage location. If a disaster strikes the primary storage location, the customer data can be retrieved or "recovered" from the recovery copies located at the remote site.

A known method of providing disaster protection is to mirror, or shadow, the primary storage data at a remote storage site. Remote dual copy, or remote data duplexing, is one form of this data mirroring solution. In remote dual copy, additional storage devices are provided in the data processing system such that an additional copy of the primary data is written to a recovery storage device. Storage devices are coupled together to form duplex pairs, each duplex pair consisting of a primary and recovery storage device. The primary storage device is located at the primary storage location, while the recovery storage device is located at the remote site. When data is written to the primary storage device, the data processing system automatically copies the data to the recovery site.

Full volume copying is an alternate method for providing disaster recovery of a database. Full volume copying may use a storage management server to generate recovery storage volumes from the primary storage volumes. Commonly, a client-server configuration includes several clients connected to a single server. The clients create client files and transfer these files to the server. The server receives the client files and stores them on several attached storage devices. When used as a storage management system, the server manages the back-up, archival, and migration of these client files. By storing the client file on an attached storage device, the server creates a first back-up, or primary, copy of the client file. The server may, in turn, create additional back-up copies of the client file to improve the data availability and data recovery functions of the storage management system. Clients may vary from small personal computer systems to large data processing systems having a host processor connected to several data storage devices. The server can also range from a small personal computer to a large host processor.

To provide disaster recovery, the storage management server must generate a recovery copy of the client file and oversee the transmission of this recovery copy to a remote site. As a disaster recovery system, the server partitions the storage subsystem into a set of primary storage volumes and a set of remote, or off-site, recovery storage volumes. The off-site recovery volumes may contain removable media, so that they can be transported to the remote site. These volumes may be formatted using the same format or a different format from that used by the primary storage volumes for storing data and commands.

The server determines which client files need to be backed-up within the storage subsystem, how frequently these back-up copies should be made, or which set of the volumes should be transported to the remote site. The server or a separate controller may manage the off-site recovery storage volumes and determine which volumes are needed for disaster recovery. Off-site storage volumes no longer needed for disaster recovery may be reclaimed and reused. The server typically coordinates the reclamation and reuse of the recovery storage volumes. Successful reclamation and reuse of recovery volumes no longer needed for disaster recovery substantially improves the efficiency and performance of a disaster recovery system.

Incremental back-up techniques have evolved to improve the efficiency of disaster recovery systems. Using these techniques, only the user files new to the primary storage volume are copied to the recovery volumes since the last periodic back-up operation was completed. Thus, incremental back-up eliminates the unnecessary copying of files that remain unchanged since the previous back-up operation. As compared to full volume copying, incremental back-up reduces the number of partially filled storage volumes at the remote site. It also reduces the amount of duplicate files and duplicate volumes stored at the remote site, thereby simplifying the management of off-site recovery storage volumes.

Regardless of the recovery system used, these prior art recovery systems do not synchronize the remote recovery logs of the hierarchial and relational databases if independent transmission protocols are used. The update logs of the two database management systems—the hierarchial database and the relational database—are independently transmitted to the remote site. In essence, the logs for the hierarchial and relational database management systems operate as though each were a separate process even if the databases are related. If disaster strikes the primary site, the respective logs may not terminate at a consistent point.

For example, if a user has a system using an IMS and a DB2 system, current recovery systems do not synchronize the recovery logs. Although recovery logs may be kept, they are not synchronized with respect to time. As explained below, this may result in database inconsistencies if disaster strikes and the recovery logs at the remote site are used to recover the databases.

What is needed is a way to coordinate the disaster recovery techniques used by disparate database management systems. Remote log processing by the database management systems must be synchronized so that updates to related databases are consistent when a primary site disaster occurs. In addition, at least one of the database management systems needs to be able to update in real time the set of database copies it maintains at the remote site to keep them current with the primary set of databases to reduce the take-over time in the event of a disaster.

SUMMARY OF THE INVENTION

Broadly, the present invention concerns a method and apparatus to coordinate disaster recovery of related hierarchial and relational databases. Remote site recovery logs transmitted to a remote site are synchronized to expedite and insure consistent recovery in the event of a disaster at the primary site.

In one embodiment, the invention may be implemented to provide a method to synchronize logs at a remote site to recover logically different but related databases in the event a disaster occurs. The related databases in one embodiment are a hierarchial structured database and a relational structured database. A recovery log is used for recovery of database records, and a time stamp derived from a common time source may be assigned to each log record.

The update log records are transmitted to a recovery database management system where the log records are maintained in creation time sequence. If a disaster strikes the primary site, and recovery of data contained within the database is needed, the remote site recovery logs and databases may be used to recover some or all of the lost data. Based upon a comparison of the time stamp for the last received update record for the hierarchial database and the time stamp for the last received update record for the relational database, the logs are truncated to a common point in time. This truncation synchronizes the recovery logs and is used to generally ensure that the databases once recovered are consistent to a point as close as possible to the point at which the disaster occurred. For example, if an IMS and a DB2 database are being used, the IMS and DB2 recovery logs would be substantially synchronized by the truncation and, after recovery, their respective databases will be substantially consistent.

In another embodiment, the invention may be implemented to provide an apparatus for synchronizing the recovery logs. The apparatus comprises a storage management server coupled to a plurality of client systems. The server includes a storage manager, databases that may be shared, and a plurality of storage pools. The storage manager is coupled to the databases and the storage pools. A first storage pool, also referred to as a primary storage pool, contains a set of primary storage volumes for storing a primary copy of client files. The primary storage volumes may be located at a primary site. A secondary storage pool, also known as a recovery storage pool, contains a set of recovery storage volumes for storing a back-up copy of client files. The recovery volumes may comprise resident volumes located at the primary storage site and off-site volumes transported to a remote storage site.

In one embodiment, the storage manager receives client files from the client system and stores a primary copy of the client files in the primary storage pool. The storage manager also performs an incremental back-up operation by copying the newly created, or newly updated, client files in the primary storage pool to the recovery storage pool. The storage manager determines which recovery volumes are marked as off-site volumes and transported to the remote storage site. The storage manager also maintains a reference list, or index, within the database linking the primary copy of a client file to the recovery copy of the file within the copy storage pool. The storage manager automatically reclaims off-site recovery volumes no longer needed for disaster recovery before transporting the recovery volumes to the primary storage site.

In still another embodiment, the invention may be implemented to provide an article of manufacture comprising a data storage device tangibly embodying a program of machine-readable instructions executable by a digital data processing apparatus to perform method steps for synchronizing hierarchial and relational recovery logs transmitted to a remote site.

The invention affords its users with a number of distinct advantages. One advantage the invention provides is a way to synchronize the recovery logs of related databases where the databases use different database structures. Another advantage of the invention is that it ensures that the data on the related databases once recovered is consistent to the point at which a disaster occurs. The invention allows the complex problem of maintaining consistent databases to be accomplished in a manner which overcomes the time-consuming and error-prone methods currently practiced and putting data integrity at risk. For example, users of current methods generally write code to help in determining a consistent point to end the logs but the code depends on non-programming interfaces and thus can deteriorate with maintenance. In other words, as system software is replaced the code has to be updated or it may become dysfunctional.

This invention also provides a number of other advantages and benefits, which should be apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein:

FIGS. 7A through 7D illustrate the truncation of respective log records as discussed with respect to task 628 shown in FIG. 6B.

DETAILED DESCRIPTION OF THE
PREFERRED EMBODIMENTS

Hardward Components & Interconnections

Figure 1:
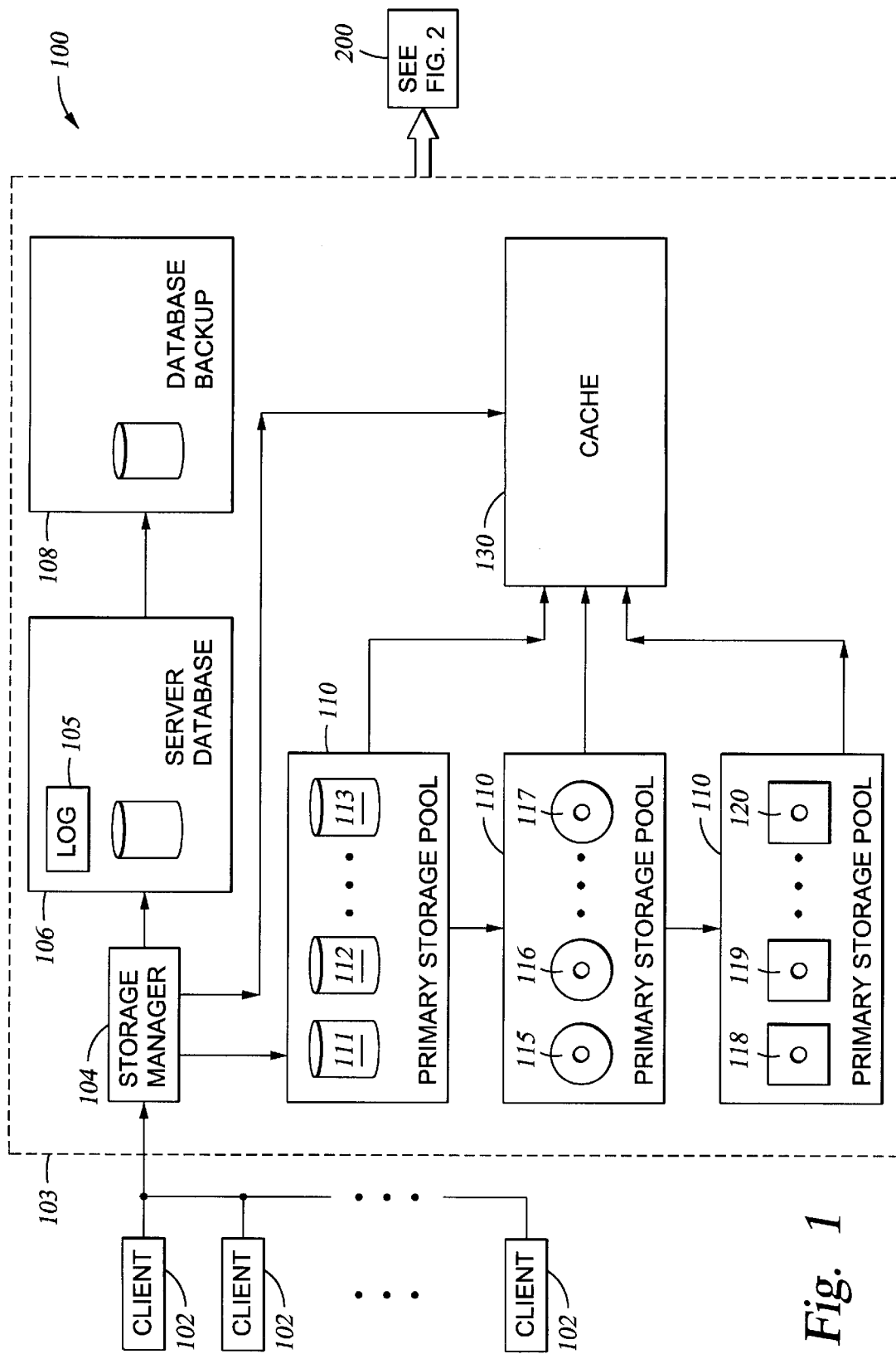
FIG. 1 is a block diagram of a data processing system showing a plurality of client systems coupled to a storage management server.

One aspect of the invention concerns an apparatus 100 for synchronizing recovery logs transmitted to a remote site for disaster recovery of related databases which may be embodied by various hardware components and interconnections as described in FIG. 1. Throughout this discussion, "recovery" refers to disaster recovery of a primary site with a remote site.

The apparatus 100 employs multiple client systems 102 coupled to a server system (primary site) 103. The primary site 103 includes a storage manager 104 coupled to a server database 106. The database may comprise multiple databases using similar or dissimilar formatting. The storage manager 104 is further coupled to a plurality of primary storage pools 110 and a cache 130. A storage pool 110 consists of a plurality of storage devices, either DASD, optical disk, or magnetic tape devices. All storage devices within the primary storage pool 110 may be, but are not necessarily, identical in type and format. The server database is further coupled to a set of recovery volumes 220 shown in FIG. 2 and providing a back-up for the server database 106. In one embodiment, the recovery volumes 220 are located at a site remote from the primary storage site.

Each client system 102 creates original user data files, or client files, which are stored within the corresponding client system if the client system is provided with a storage system. Regardless, the client systems 102 transfer client files to the server system 103. Transferring client files to the primary site 103 inherently provides a back-up mechanism within the server for original client files stored within the client system. The storage manager 104 directs the client file to a storage device, or storage volume, within a primary storage pool 110. The primary storage pool stores a primary copy of the client files. The storage manager 104 maintains a log 105 within the server database 106 listing the files stored within the primary storage pool 110 and the cache 130 of the primary site 103. Once the client file is stored within a primary storage pool 110, the storage manager 104 updates the server database 106 and logs the updates in log 105 at the primary site 103.

In one embodiment, the server system 103 might also include the cache 130. This cache is used by the storage manager 104 to coordinate temporary storage of data copied from nonvolatile storage during a restart recovery process. In one embodiment, the cache 130 is volatile storage. In another embodiment, the cache is nonvolatile but erasable. Regardless, if the cache 130 becomes full during a restart recovery process, over-flow data may be written to another cache, for example, cache (not shown) located in the storage manager 104.

Figure 2:
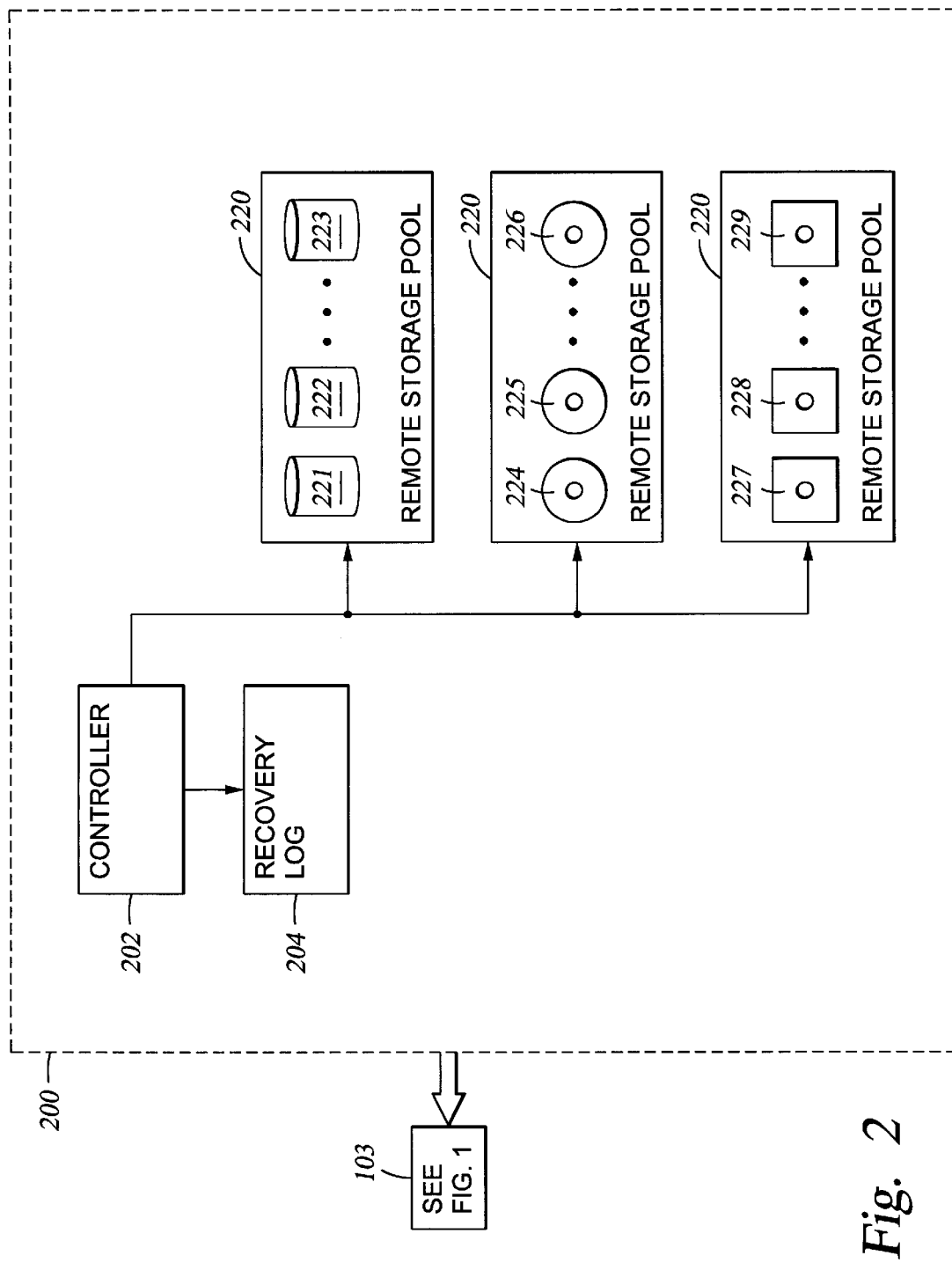
FIG. 2 is a block diagram of the storage management server in FIG. 1 providing off-site storage volumes for disaster recovery.

In one embodiment, the server system might also generate an additional back-up recovery copy of the client file and store this recovery copy on a storage device, or storage volume, within a remote site 200 shown in FIG. 2. The storage manager 104 coordinates this operation. Once the additional recovery copy is created, the storage manager 104 updates the log 105 of server database 106 to catalog the recovery copy of the client file. In addition, the log entry within the server database corresponding to the recovery copy includes cross-reference to the primary copy of the client file. Thus, the primary copy in the primary storage pool 110 is linked to the recovery copy.

FIG. 2 shows a server (referred to as remote or off-site) 200 of FIG. 1 configured as a remote disaster recovery system. The disaster recovery system includes a remote storage pool 220 within the remote site 200. The remote site server 200 also includes the controller 202 and a recovery log 204. In addition, the remote storage pool 220 may contain copies of the data volumes contained in the primary storage volumes located within the primary storage pools 110 and any other resident copy storage volumes within the primary storage site 103. The remote site 200 contains remote storage pool 220 which are copy storage volumes that have been transferred from the primary storage site 103 at the direction of the storage manager 104.

The storage manager 104 determines which primary storage pool volumes 111–120 should be used for back-up storage and recovery, and then copies and marks the designated volume in the server database 103 as an off-site storage volume. The copies are then delivered to the remote site 200. The storage manager 104 uses the server database 106 to monitor the recovery copies of the client files stored on the off-site storage volumes 221–229. The storage manager 104 can then determine when an off-site volume is no longer needed for disaster recovery, and marks this volume for deletion or transfer back to the primary storage site 103. Further, as each database transaction is executed and each database recovery copy is made, an entry is made by the storage manager 104 in the log 105 to keep track of each transaction and data update. In another embodiment, back-up volumes to the primary storage pool 110 may be kept at the primary site 103 in addition to the remote storage pool 220 back-up copies housed at the remote site 200.

Regardless of whether primary storage pool volume 111 through 120 is marked and copied as an off-site volume and then physically transported to the remote site, or whether the contents of the copy of the primary storage pool volumes is transmitted to the remote site via a data link, the remote site 200 shown in FIG. 2 processes the data in a similar manner. When updated data is received by the controller 202 of the remote system 200, the controller decides which of the off-site storage volumes 220 and respective recovery logs will receive the updated data. If an existing file on a remote site volume 221 through 229 is to be updated, the controller 202 routes the updated data to the respective volume and log. If no current file exists that needs to be updated, the controller 202 may allocate the file to any of the storage volumes 220. As the updated data is received, the controller 202 also updates a recovery log 204.

The log 204 acts as index for the data records being maintained on the remote storage pool 220 volumes. The recovery log 204 may also perform other functions as discussed below. The transfer of data from the primary storage site 103 to the remote site 200 is coordinated by the storage manager 104 and the controller 202.

Despite the specific foregoing description, ordinarily skilled artisans (having the benefit of this disclosure) will recognize that the apparatus discussed above may be implemented in a machine of different construction, without departing from the scope of the invention.

Operation

In addition to the various hardware embodiments described above, a different aspect of the invention concerns a method for recovering related databases using the present invention.

Transaction Execution

The apparatus shown in FIGS. 1 and 2 are used in one embodiment to maintain related databases. For example, the server database 106 may contain multiple databases where the databases do not share a similar logical structure or format. Regardless, each of the databases is intended to contain data which reflects a real state of the information that database is supposed to capture. When the databases reflect what is the current state of the data, the databases are deemed consistent.

To better understand the recovery system of the present invention, the following terminology should be helpful. A database transaction is a program unit whose execution preserves the consistency of the database. For example, if before a transaction executes the database is in a consistent state then, when the next transaction completes its execution, the database remains in a consistent state. The transaction assesses and possibly updates various data items contained in the database. Each of the data items may be read by the transaction and is written by the transaction if it updates that data item. A transaction is the work that occurs between the beginning of a unit of work and a commit or abort as defined below.

Figure 3:
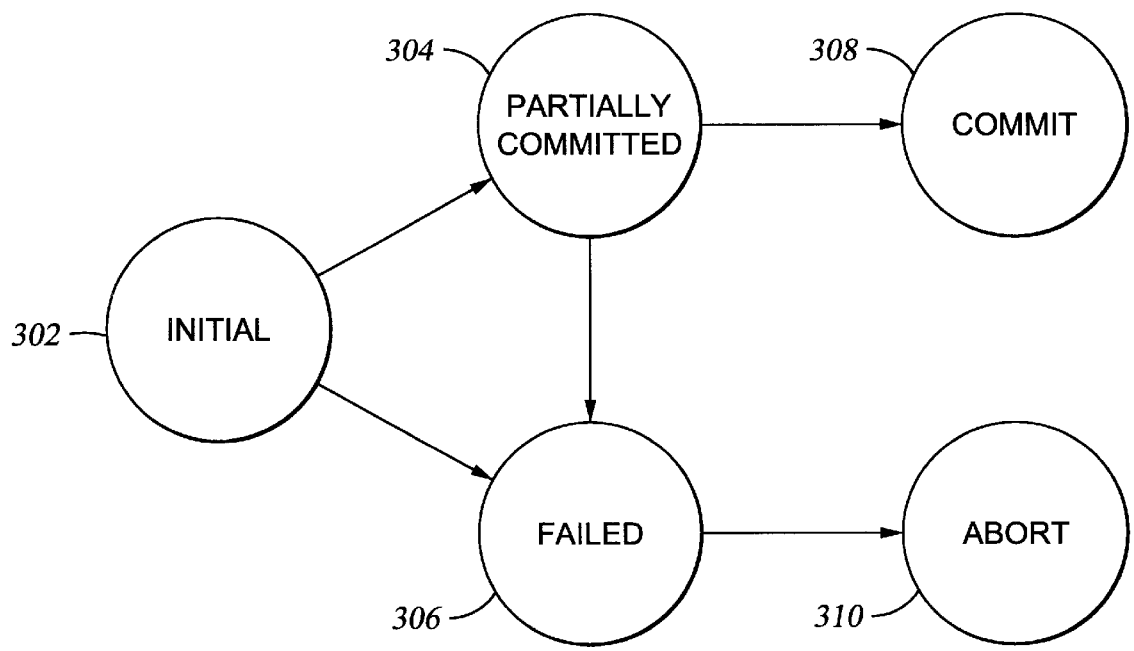
FIG. 3 is a block diagram illustrating a procedure commonly followed in committing updated data to a database.

As reflected in FIG. 3, a transaction block diagram is shown. The transaction is shown in its initial state in task 302. When it reaches its last statement, it enters a partially committed state in task 304. At this point, the transaction has completed its execution, but it is still possible that it may have to be aborted, which includes rolling back the non-committed data, since the actual updates may not have been output to storage yet, and thus a hardware failure may preclude its successful completion. In one embodiment of the present invention, writing to storage takes place only after a transaction has entered the commit stage as shown in task 308. As discussed below, one way to implement such a scheme is to store any value associated with such writing to storage temporarily in a nonvolatile storage, and to perform the actual writes only at commit time 308. A committed transaction will then be able to complete its write except in the case of hardware storage failures.

The transaction enters the failed state in task 306 if it is determined that the transaction cannot proceed with normal execution, that is, for example, due to hardware or logical errors. If failure occurs, the transaction must be rolled-back. Once a rollback has occurred, the transaction enters the aborted state in task 310.

Figure 4:
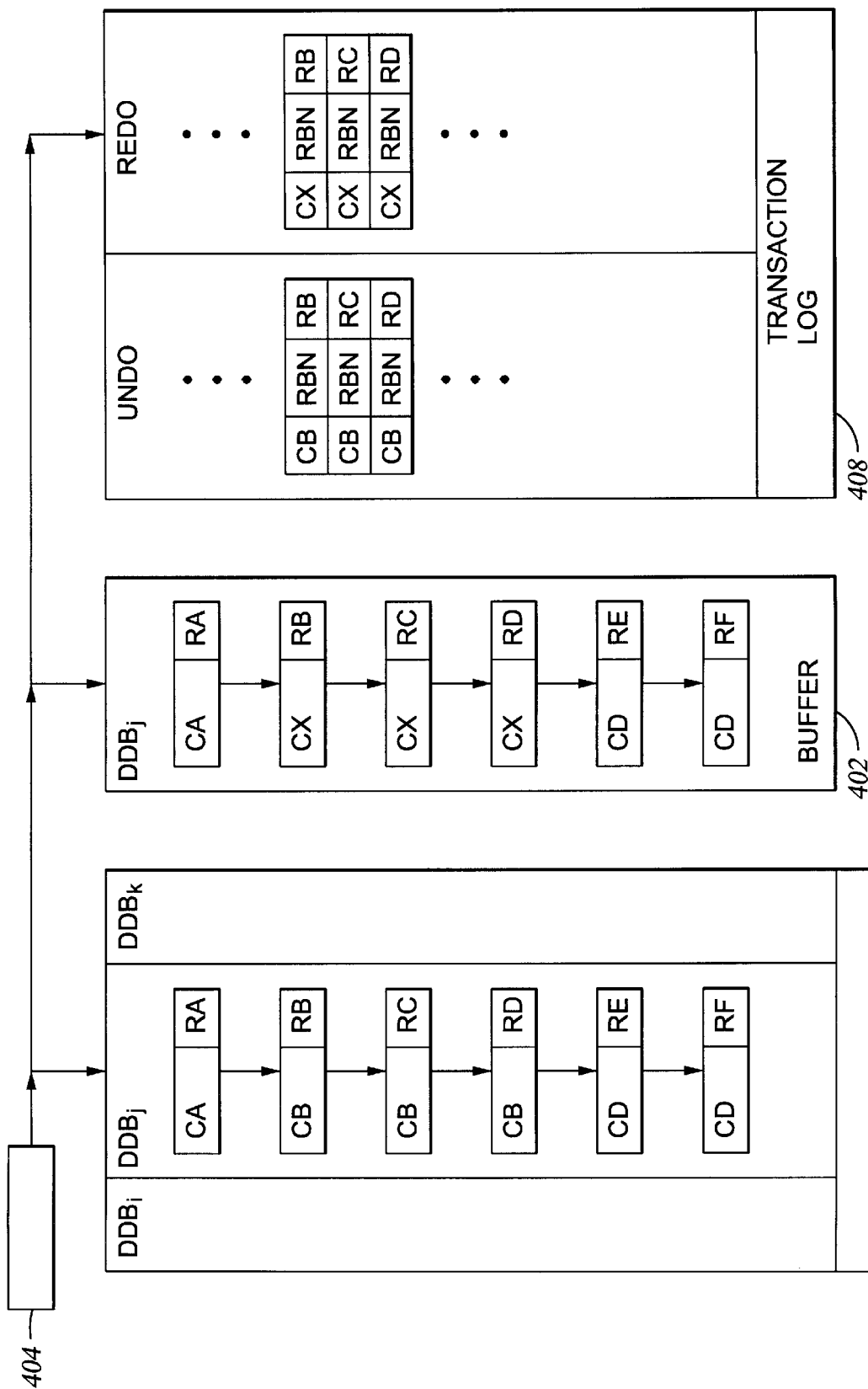
FIG. 4 is a block diagram illustrating details of the database management system of FIG. 2.

As applied to this invention and as illustrated in FIG. 4, "forward" database updating is performed by using REDO records of a transaction log 408. As an example, assume that records, identified by record numbers RA–RF are included in the defined data block j (DDBj) which is included in a data set stored in a database 406. Assume next a transaction against records RB–RD of DDBj, and that the records are to be updated as a result of the transaction. For updating, storage manager 404 transfers the page DDBj to a buffer 402 where the records RB–RD are updated, in each case by changing record data CB to CX. During the processing of these records, log entries are made in the sequence in which the records were updated. Each record update results in the writing of an UNDO and REDO record to the transaction log 408. For example, the transaction log entry for updating record RB includes an UNDO record with a field containing the record data before updating (CB), a field identifying the record (RB), and a field containing a relative block number (RBN) which identifies the location of the primary storage page containing the record. The REDO component of the log record includes a field containing the update of the record data (CX) and the RBN and RB fields identifying, respectively, the page and the record. Assuming completion of the transaction or set of transactions which update records RB–RD, the storage manager 404 will write the buffer page to the primary storage location for DDBj. Later, if recovery is required, the recovery process will use the transaction log REDO records to update records RB–RD.

Forward and "backward" updating recovery functions are available in database products manufactured by the IBM Corporation. Forward and backward updating are supported in the database manager of the IBM DB2 and IMS/ESA program products. In these products, UNDO records are logged in addition to REDO records. If a transaction associated with a REDO record ABORTs, the record data from the UNDO record is logged as a REDO record and is applied to the database, thus "backing-out" the original update to the record. In the FAST PATH database manager of the IBM IMS/ESA program product used in one embodiment, UNDO records are not logged. Rather, changes are withheld from the database until REDO records have been logged and the updating transactions have completed. Successful completion of the transaction is indicated by a COMMIT operation which is recorded by a COMMIT record in the transaction log. If the transaction is abnormally terminated, an ABORT record is entered in the log.

After the server database 106 and the storage pools of server 103 have been updated by a transaction, the off-site recovery storage volumes of remote site 200 may be updated, as described below with respect to the method of the invention. However, because of the related databases in one embodiment of the present invention where each database may not employ a common logical structure or format, the present invention provides a method to coordinate recovery of the related databases and the logs used for recovery. The method of the present invention is described in detail as to its overall sequence of operation below.

Overall Sequence of Operation

Figure 6A:
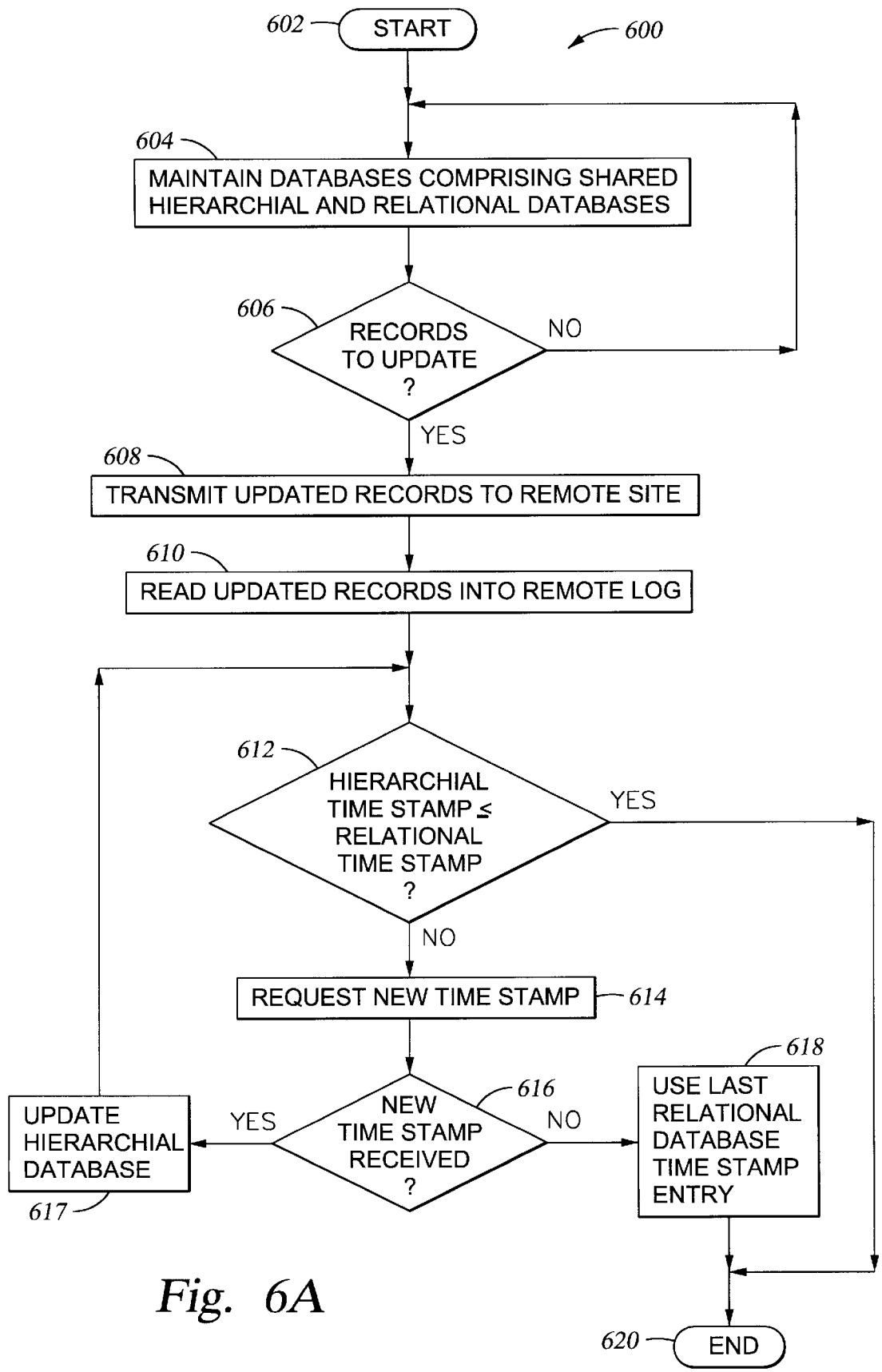
FIGS. 6A and 6B are a flowchart of an operational sequence for synchronizing the hierarchial and relational logs transmitted to a remote site for recovering related databases.
Figure 6B:
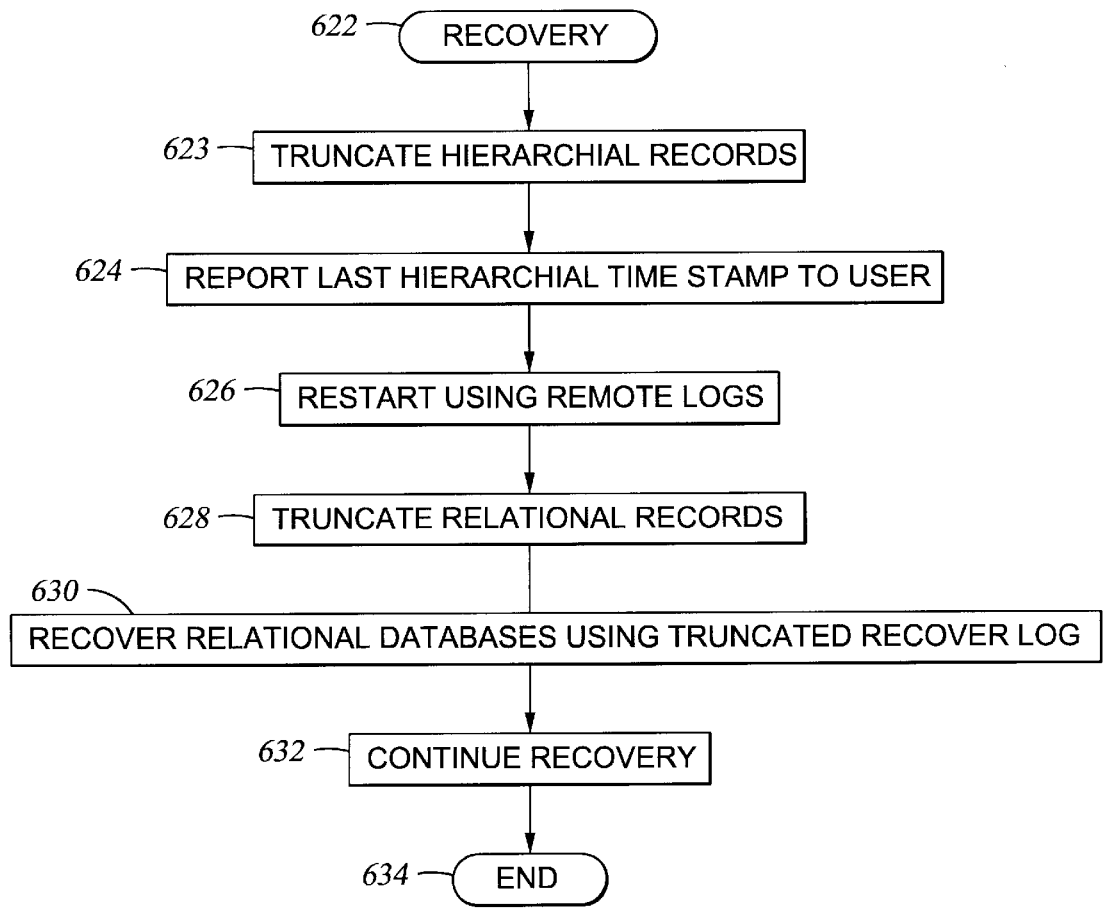

FIGS. 6A and 6B show a sequence of method steps 600 to illustrate one example of the method aspect of the present invention. For ease of explanation, but without any limitation intended thereby, the example of FIGS. 6A and 6B are described in the context of the apparatus 100 described above. The steps are initiated in task 602, when a primary database system linked to a remote recovery facility processes transactions. The primary database comprises a hierarchial database and a relational database. In the one embodiment, the hierarchial database is a IMS database and the relational database is a DB2 database.

The related hierarchial and relational databases are maintained in task 604. Maintaining the primary database comprises updating the database with changes to the data stored therein and continually updating that data. Several techniques are known in the art for maintaining the primary database in a consistent state. The primary database may incorporate separate logs for the hierarchial database and the relational database, and may implement a plurality of logs for each. The update log information may be transmitted to a remote site to insure recovery if disaster recovery is required by the primary database.

In maintaining a database, an entry is made to each update log and a time stamp is assigned to each entry. Commonly, the time stamp is assigned by the storage manager 104 shown in FIG. 1 or the controller 202 shown in FIG. 2, however, those skilled in the art will realize that any processor used in conjunction with the primary database may assign the time stamp. The time stamp represents the creation time sequence for a given entry, that is, the time at which the entry was created in a respective log.

When entries to the update log are complete in task 606, the update log records are transmitted to the remote site for backup protection. If no records need to be updated as the result of a transaction, the method returns to task 604 and continues maintaining the database.

If hierarchial log records from task 608 are transmitted from the primary database to the recovery database, they are processed only up to the point that data has been captured on the relational database log volumes at the remote site. The point is established by comparing entry time stamps. This assures that in the event of a primary site disaster the truncation point for the hierarchial tracking logs will be earlier in time than the end point of the relational tracking logs. Using the time stamp of task 604, the updates to the records are transmitted in task 608 to the remote site. In one embodiment, the record updates may be transmitted to the recovery database's management system including controller 202 in parallel in task 610.

As part of maintaining the recovery resources, the storage manager 104 or the controller 202 keeps track of the time stamp of the last hierarchical and relational log entries. The hierarchical time stamp is compared to the last relational log in task 612, then the updates are applied to the hierarchical databases. If the hierarchical time stamp is not less than or equal to the relational log time stamp, then the method 600 requests a new time stamp for the last entry to the relational log in task 614. The request seeks to determine the time stamp of the last entry to the relational database logs.

If a new time stamp for the last entry to the relational database (relational time stamp) is received within a designated period of time in task 616, then the method 600 again compares the hierarchial database time stamp in task 617 (hierarchial time stamp) with the relational time stamp in task 612, and if the hierarchial time stamp is less than or equal to the relational time stamp, the updated log records are applied to the remote site 200 hierarchial database. By assuring that the hierarchial time stamp is less than or equal to the relational time stamp, the update logs for the hierarchial database and the relational database are able to be synchronized for later processing (truncation).

Returning to task 616, if a new hierarchial time stamp has not been received within a predetermined time period, then the method 600 uses the last relational database time stamp in task 618 as the point in time to stop applying updates to the remote site hierarchial databases. Transaction updates to the databases which occurred after this time stamp are not applied unless a new relational time stamp is received in task 618. This routine maintenance of the databases and related logs ends in task 620. If disaster recovery is required, this time stamp represents the end time stamp of the hierarchial relational logs. The hierarchial logs are truncated at the point represented by this time stamp in task 623 shown in FIG. 6B.

If disaster strikes and a takeover of the primary site functions by the remote site is required, the remote recovery method of the invention is implemented as shown in FIG. 6B beginning at task 622. For example, the primary site may be rendered unusable due to fire, flood or earthquake.

If disaster recovery is required, the last hierarchial time stamp recorded on the recovery log is reported in task 624. This time stamp is used to coordinate the remote site 200 recovery. After the time stamp is reported, the remote site's controller 202 may automatically initiate recovery. In another embodiment, the time stamp is reported to a user, such as a database administrator, and the user initiates the recovery. For example, the last hierarchial time stamp may be displayed on a device such as a monitor, printed-out on a printer, audibly output, or otherwise communicated to the user. The communication device used may be interfaced with the client 102 shown in FIG. 1 and/or the remote site 200 shown in FIG. 2. In either case, the hierarchial time stamp is reported as the "recovery timestamp" in task 624 and used to synchronize the recovery logs to that point in time for recovery and restart purposes in task 626.

In one embodiment, the end user may only use the last hierarchial time stamp as the recovery time stamp. The time stamp selected is used as a truncation point to synchronize the recovery log records at the selected point in time in task 628. These recovery log records, comprising the hierarchial and relational database recovery logs, are used to restart and recover the primary database at the remote site in task 630.

Truncation of the recovery log records at the remote site is best understood referring to FIGS. 7A through 7D. FIGS. 7A and 7B show a time line for record entries for the preferred embodiment DB2 logs and IMS logs received at the remote site, respectively, used in conjunction with the DB2 and IMS databases. At time 0, no record entries have been made. As time increases, indicated by the line increasing to the right, an increasing number of record entries have been made to each log. FIG. 7A shows the DB2 logs having an end time marked at the point-in-time 702. FIG. 7B shows the IMS LOG #1 having an end time marked at a point-in-time 704 and IMS LOG #2 continuing past time 702.

The recovery logs are constructed such that the hierarchial database recovery time lags the relational database recovery time, that is, that processing of entries in the IMS logs shown in FIG. 7B always lag the recovery time of the DB2 logs shown in FIG. 7A. Comparison of FIGS. 7A and 7B indicate that the hierarchial database recovery time 704 for the IMS logs does lag the relational database recovery time 702. As shown in FIGS. 7C and 7D, respectively, the DB2 logs are truncated in the present invention to the hierarchial database recovery time represented by time stamp 704, and the hierarchial logs are also truncated to that point in time. The DB2 log data contained on the DB2 logs at a time after recovery time stamp 704 is not used in the data recovery method 600. This "truncation" results in the DB2 log recovery time equaling the IMS log recovery time which synchronizes the logs used to recover the hierarchial and relational databases.

After truncation of the logs, recovery continues in task 632. During recovery, the primary site is not available and recovery is coordinated from the remote site 200. Recovery continues when the hierarchial and relational databases are restarted at the remote site 200. The method ends in task 634.

During remote site recovery, update log records are written to the logs at the remote site. The relational databases are not maintained in real time as update log records are received. They are recovered after a disaster has occurred using normal recovery such as generally discussed in U.S. Pat. No. 5,615,329, issued Mar. 25, 1997, entitled "REMOTE DATA DUPLEXING," incorporated herein by reference and assigned to the assignee of the present invention, or using other commonly practiced recovery utilities. Once the remote site 200 databases have been recovered, the recovered databases become the "primary" database because the original primary database is no longer useable. These remote logs are used to restore the primary database to its prior state as of the time reported in task 624 used for recovery purposes.

In one embodiment, shadowing of the relational remote site databases may occur by running the recovery utility periodically at the remote site 200. The hierarchial remote site databases are shadowed in real time but the relational remote site databases are not because the remote relational logs are subject to truncation—allowing the hierarchial recovery log to always lag the relational recovery log—as discussed above. This periodical "shadowing" of the relational remote site 200 databases reduces the time required to recover the relational databases if a primary site disaster strikes.

Signal-Bearings Media

Such a method may be implemented, for example, by operating the apparatus 100 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to synchronize recovery logs transmitted to a remote site to recover related databases having dissimilar logical structures or formats.

Figure 5:
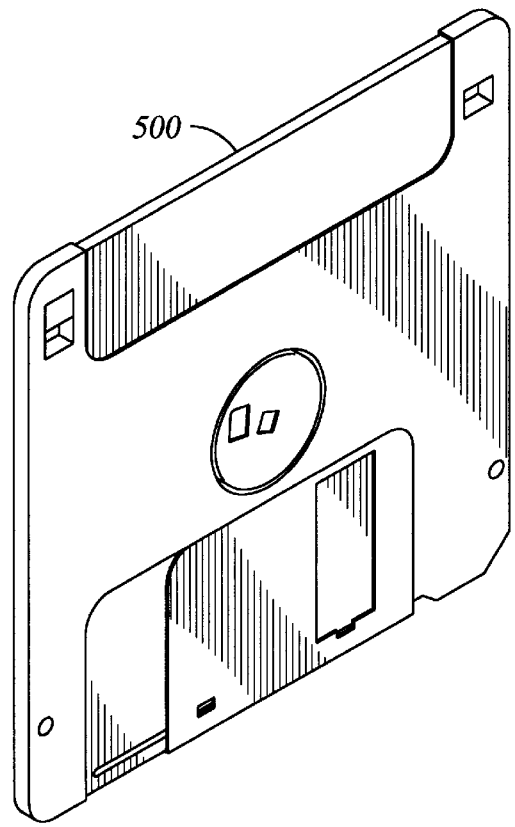
FIG. 5 is a perspective view of an exemplary signal-bearing medium in accordance with the invention.

This signal-bearing media may comprise, for example, RAM (not shown) contained within the apparatus 100. Alternatively, the instructions may be contained in another signal-bearing media, such as a magnetic data storage diskette 500 as shown in FIG. 5, directly or indirectly accessible by the apparatus 100. Whether contained in the apparatus 100 or elsewhere, the instructions may be stored on a variety of machine-readable data storage media, such as DASD storage (e.g., a conventional "hard drive" or a RAID array), magnetic tape, electronic read-only memory (e.g., ROM, CD-ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise lines of compiled C, C++, or similar language code commonly used by those skilled in the programming for this type of application arts.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method for synchronizing a recovery log to a remote site for disaster recovery of a primary database having related hierarchial and relational databases, comprising:

processing hierarchial records and relational records of the recovery logs wherein a time stamp of each hierarchial record is $\leq$ to a time stamp for a last entered relational record, and wherein a time stamp is used to mark a point in time and a hierarchial record reflects hierarchial database data and a relational record reflects relational database data.

2. The method recited in claim 1, further comprising transmitting the hierarchial records to the remote site independent from the transmission of the relational database.

3. The method recited in claim 2, further comprising maintaining a hierarchial database in real time at the remote site that shadows the primary site hierarchial database.

4. The method recited in claim 3, further comprising:
   (a) continually comparing, in sequence by time stamp, the time stamp for each hierarchial record to a last entered time stamp for a relational record; and
   (b) processing recovery log records:
      (1) if the time stamp for the hierarchial record is $\leq$ to the last entered time stamp for the relational record, processing the hierarchial record and selecting a next hierarchial record for comparison;
      (2) if the time stamp for the hierarchial record is not $\leq$ to the last entered time stamp for the relational record, requesting a new last entered time stamp for a relational record;
         (i) if the time stamp for the hierarchial record is $\leq$ the new last entered time stamp for the relational record, processing the hierarchial record and selecting a next hierarchial record;
         (ii) if no new time stamp is received within a specified period of time, periodically requesting a new last entered time stamp for a relational record until a new last entered time stamp for a relational record is obtained; and
         (iii) suspending hierarchial record processing until a new last entered time stamp for a relational record is obtained.

5. The method recited in claim 4, further comprising truncating a recovery log when a primary site disaster occurs at a point in time substantially coinciding with the last time stamp used for processing recovery log records.

6. The method recited in claim 5, further comprising:

truncating first the hierarchial records at the point in time;

reporting a truncation time; and then truncating the relational records at the truncation time.

7. The method recited in claim 6, further comprising processing the hierarchial and the relational records entered into the recovery logs and having an earlier time stamp than the truncation time.

8. The method recited in claim 7, further comprising maintaining a primary site, the primary site including a database and logs, the logs comprising updated records to be transferred to the database, the database including related hierarchial and relational databases, the remote site including recovery logs and a recovery database, the recovery database including related hierarchial and relational databases, the recovery logs comprising updated records to be transferred to the recovery database, the recovery site used to take over the database functions of the primary site if a disaster occurs at the primary site.

9. A signal-bearing medium tangibly embodying a program of machine-readable instructions executable by a digital processing apparatus to perform a method for synchronizing update recovery logs transmitted to a remote site for disaster recovery of a primary database having related hierarchial and relational databases, said method comprising:

processing hierarchial records and relational records of the recovery logs wherein a time stamp of each hierarchial record is $\leq$ to a time stamp for a last entered relational record, and wherein a time stamp is used to mark a point in time and a hierarchial record reflects hierarchial database data and a relational record reflects relational database data.

10. The medium recited in claim 9, the method further comprising transmitting the hierarchial records to the remote site independent from the transmission of the relational records.

11. The medium recited in claim 10, the method further comprising maintaining a hierarchial database in real time at the remote site that shadows the primary site hierarchial database.

12. The medium recited in claim 11, the method further comprising:
   (a) continually comparing, in sequence by time stamp, the time stamp for each hierarchial record to a last entered time stamp for a relational record; and
   (b) processing recovery log records:
      (1) if the time stamp for the hierarchial record is $\leq$ to the last entered time stamp for the relational record, processing the hierarchial record and selecting a next hierarchial record for comparison;
      (2) if the time stamp for the hierarchial record is not $\leq$ to the last entered time stamp for the relational record, requesting a new last entered time stamp for a relational record;
         (i) if the time stamp for the hierarchial record is $\leq$ the new last entered time stamp for the relational record, processing the hierarchial record and selecting a next hierarchial record;
         (ii) if no new time stamp is received within a specified period of time, periodically requesting a new last entered time stamp for a relational record until a new last entered time stamp for a relational record is obtained; and (iii) suspending hierarchial record processing until a new last entered time stamp for a relational record is obtained.

13. The medium recited in claim 12, the method further comprising truncating a recovery log when a primary site disaster occurs at a point in time substantially coinciding with the last time stamp used for processing recovery log records.

14. The medium recited in claim 13, the method further comprising:

truncating first the hierarchial records at the point in time;

reporting a truncation time; and then truncating the relational records at the truncation time.

15. The medium recited in claim 14, the method further comprising processing the hierarchial and the relational records entered into the recovery logs and having an earlier time stamp than the truncation time.

16. The medium recited in claim 15, the method further comprising maintaining a primary site, the primary site including a database and logs, the logs comprising updated records to be transferred to the database, the database including related hierarchial and relational databases, the remote site including recovery logs and a recovery database, the recovery database including related hierarchial and relational databases, the recovery logs comprising updated records to be transferred to the recovery database, the recovery site used to take over the database functions of the primary site if a disaster occurs at the primary site.

17. An apparatus used to synchronize recovery logs transmitted to a remote site for disaster recovery of a primary database, the apparatus comprising:

a primary site including primary data storage, the primary storage used for storing the primary database, the primary storage including at least one log comprising updated records for transfer to the primary database, the primary database including a hierarchial database and a relational database;

a remote site including remote site data storage, the remote site storage used for maintaining the remote database and including at least one recovery log;

a link communicatively coupling the primary site with the remote site;

a processor communicatively linked to the primary site and the remote site, the processor executing a series of commands to synchronize recovery logs transmitted from the primary site to the remote site by:

processing hierarchial records and relational records of the recovery logs wherein a time stamp of each hierarchial record is ≦ to a time stamp for a last entered relational record, and wherein a time stamp is used to mark a point in time and a hierarchial record reflects hierarchial database data and a relational record reflects relational database data.

18. The apparatus recited in claim 17, the processor further executing commands for transmitting the hierarchial records to the remote site independent from the transmission of the relational records.

19. The apparatus recited in claim 18, the processor further executing commands for maintaining a hierarchial database in real time at the remote site that shadows the primary site hierarchial database.

20. The apparatus recited in claim 19, the processor further executing commands for:

(a) continually comparing, in sequence by time stamp, the time stamp for each hierarchial record to a last entered time stamp for a relational record; and (b) processing recovery log records:

(1) if the time stamp for the hierarchial record is ≦ to the last entered time stamp for the relational record, processing the hierarchial record and selecting a next hierarchial record for comparison;

(2) if the time stamp for the hierarchial record is not ≦ to the last entered time stamp for the relational record, requesting a new last entered time stamp for a relational record;

(i) if the time stamp for the hierarchial record is ≦ the new last entered time stamp for the relational record, processing the hierarchial record and selecting a next hierarchial record;

(ii) if no new time stamp is received within a specified period of time, periodically requesting a new last entered time stamp for a relational record until a new last entered time stamp for a relational record is obtained; and (iii) suspending hierarchial record processing until a new last entered time stamp for a relational record is obtained.

21. The apparatus recited in claim 20, the processor further executing commands for truncating a recovery log when a primary site disaster occurs at a point in time substantially coinciding with the last time stamp used for processing recovery log records.

22. The apparatus recited in claim 21, the processor further executing commands for:

truncating first the hierarchial records at the point in time;

reporting a truncation time; and then truncating the relational records at the truncation time.

23. The apparatus recited in claim 22, the processor further executing commands for processing the hierarchial and the relational records entered into the recovery logs and having an earlier time stamp than the truncation time.

24. An apparatus for synchronizing update recovery logs at a remote site for recovery of related hierarchial and relational databases, the apparatus comprising:

a means for processing hierarchial records and relational records of the recovery logs wherein a time stamp of each hierarchial record is ≦ to a time stamp for a last entered relational record, and wherein a time stamp is used to mark a point in time and a hierarchial record reflects hierarchial database data and a relational record reflects relational database data;

means for maintaining a hierarchial database in real time at the remote site that shadows the primary site hierarchial database; and means for transmitting the hierarchial records to the remote site independent from the transmission of the relational records.

25. The apparatus recited in claim 24, including:

(a) continually comparing, in sequence by time stamp, the time stamp for each hierarchial record to a last entered time stamp for a relational record; and (b) processing recovery log records:

(1) if the time stamp for the hierarchial record is ≦ to the last entered time stamp for the relational record, processing the hierarchial record and selecting a next hierarchial record for comparison;

(2) if the time stamp for the hierarchial record is not ≦ to the last entered time stamp for the relational record, requesting a new last entered time stamp for a relational record;

(i) if the time stamp for the hierarchial record is ≦ the new last entered time stamp for the relational record, processing the hierarchial record and selecting a next hierarchial record;
(ii) if no new time stamp is received within a specified period of time, periodically requesting a new last entered time stamp for a relational record until a new last entered time stamp for a relational record is obtained; and
(iii) suspending hierarchial record processing until a new last entered time stamp for a relational record is obtained; and truncating a recovery log when a primary site disaster occurs at a point in time substantially coinciding with the last time stamp used for processing recovery log records.

26. The apparatus recited in claim 25 wherein the truncation means truncating first the hierarchial records at the point in time, reporting a truncation time, and then truncating the relational records at the truncation time.

27. The apparatus recited in claim 26, including a means for processing the hierarchial and the relational records entered into the recovery logs and having an earlier time stamp than the truncation time.

* * * * *